United States Patent [19]
Hundstad et al.

[11] 3,842,365
[45] Oct. 15, 1974

[54] PULSE GLOW GENERATION FOR LASER SYSTEMS

[75] Inventors: Richard L. Hundstad, Pittsburgh, Pa.; Owen Farish, Bearsden, Glasgow, Scotland

[73] Assignee: Westinghouse Electric Corporation, Pittsburgh, Pa.

[22] Filed: May 30, 1973

[21] Appl. No.: 365,388

[52] U.S. Cl. .............................. 331/94.5, 330/4.3
[51] Int. Cl. ............................................. H01s 3/09
[58] Field of Search .................. 331/94.5; 313/231; 315/111; 330/4.3

[56] References Cited
UNITED STATES PATENTS 3,588,740  6/1971  Bell ................................. 331/94.5
3,696,307  10/1972  Beaulieu et al. .................. 331/94.5

Primary Examiner—William L. Sikes
Attorney, Agent, or Firm—D. Schron

[57] ABSTRACT

A gas laser tube apparatus for producing pulse glow excitation of the laser system using a pulse voltage superimposed on a DC bias voltage to produce a glow discharge. The biasing voltage is applied across two electrodes positioned within the envelope of the gas laser tube and a pulse voltage is superimposed thereon from a pulse generating circuit. The necessity for high power switching is obviated since a major portion of the energy supplied to the discharge between the electrodes is transferred to the discharge gap from a storage element of the DC bias circuit. Consequently, the power supplied from the pulse circuit can be lowered and high cost switching circuitry can be eliminated.

6 Claims, 4 Drawing Figures

PATENTED OCT 15 1974 3,842,365

PULSE GLOW GENERATION FOR LASER SYSTEMS

BACKGROUND OF THE INVENTION

1. Field of the Invention

This invention relates to gas laser tubes and more particularly to pulse glow generation using a bias circuit capable of storing energy for transfer to the pulsed gap.

2. Description of the Prior Art

One of the best sources for high average power laser output has been the high pressure transversely excited laser. A typical configuration of such a laser provides for two long electrode assemblies, often comprising a number of pin cathodes and a continuous anode, each a few centimeters wide and spaced a few centimeters apart. The optical axis of the laser is parallel to the longitudinal axis of the electrodes with the electric field being transverse thereto. The gas flow through the electrode gap is transverse to both the optical axis and electrical discharge and typically would have a velocity in the range of 40 to 120 meters per second.

In such lasers, population inversion is obtained from a pulse glow discharge generated by applying a pulse voltage to the electrodes. The switching circuit for applying the pulse voltage must be capable of handling high current pulses in sub-microsecond times at a very high repetition rate. If energy can be transferred to the excitation region from other than the pulsed power supply, a lower energy switch could be utilized to supply the voltage pulse to initiate the discharge.

One prior art laser starting circuit does take advantage of a DC bias in concert with a triggering mechanism such as a pulse generator. The laser starting circuit, however, uses two DC power sources in addition to a pulse generator. Energy is stored in a capacitor or the booster supply circuit and is discharged through a resistor to the gas tube; therefore, a resistive loss is experienced in transferring the stored energy from the capacitor to the discharge in the gas tube.

SUMMARY OF THE INVENTION

According to the present invention, a gas laser tube is provided having at least two electrode assemblies which for instance, can be comprised of a planar surfaced anode set opposite a multiple pin cathode. Connected to the electrode assembly is a medium-voltage, high-energy DC bias circuit which includes an energy storage element and which allows the transfer of energy from the storage element to the electrode gap. A low-energy, high-voltage pulse generator, also connected to the electrode assembly, is used to initiate the corona discharge within the gas tube. A switching arrangement which can include a high voltage diode selectively connects the storage means to the discharge gap so that energy is transferred to the pulsed glow discharge. The switch alternately acts to isolate the bias circuit from the pulse generator.

DETAILED DESCRIPTION OF THE INVENTION

Figure 1:
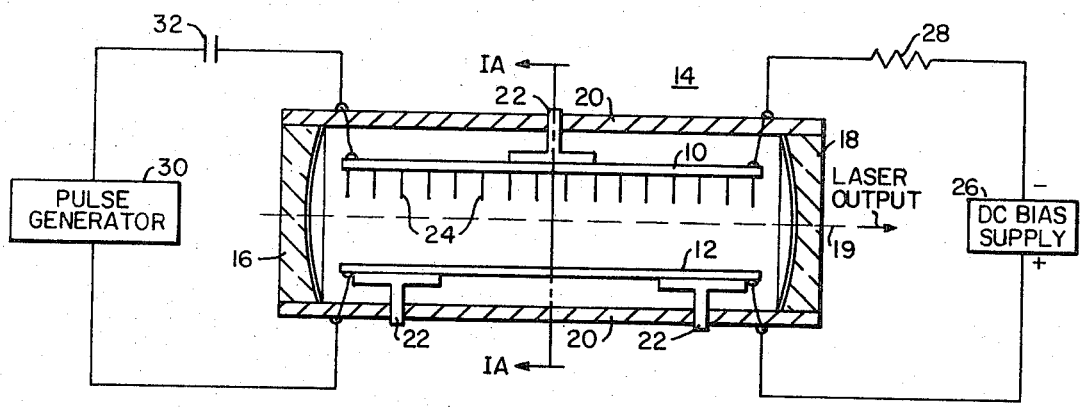
FIG. 1 is a schematic diagram of a circuit and tube for providing a pulse glow discharge.

FIG. 1 shows a circuit in which a pulse voltage is superimposed upon a DC bias applied to the electrodes 10 and 12 positioned within elongated envelope 14. The envelope 14 has an essentially totally reflecting optical element 16 and a partially transmitting optical element 18 positioned opposite one another and orthogonal to the longitudinal optical axis 19 of the laser. Wall 20 is sealed in an air tight manner to the optical reflective element 16 and 18 to provide an integral enclosure for the gas medium of the laser.

Once the envelope 14 has been evacuated it is filled with a suitable gas which is capable of lasing.

The electrode assemblies 10 and 12 are supported within the envelope 14 by support means 22. The first electrode assembly 10 which acts as a cathode has a plurality of pin elements 24 set orthogonal to the longitudinal axis of the assembly. The second electrode assembly 12 acts as an anode and is positioned with its surface parallel to the longitudinal axis of the first assembly 10, but orthogonal to the pin elements 24, and is parallel to the optical axis 19 of the laser.

It will readily be understood by those skilled in the art that the particular electrode configuration and geometry shown in FIG. 1 may be modified so long as the gas envelope and electrode assembly will support a pulsed glow discharge. Two parallel continuous electrode assemblies might be used for instance instead of the multi-pin cathode and continuous anode assemblies.

Gas supply means for the elongated envelope 14 are not shown in FIG. 1. However, FIG. 1A, being a sectional view taken along the line 1A of FIG. 1, shows a typical gas flow transverse to the electrical discharge through envelope 14. The gas flow is also transverse to the longitudinal optical axis 19 of the gas laser. Actual gas supplying means, cooling means and recirculating means for the gas are not shown in that they are well known in the art.

Figure 1A:
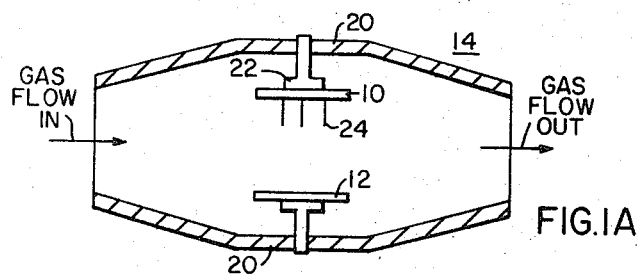
FIG. 1A is a sectional view of the gas tube taken along line 1A of FIG. 1.

In FIGS. 1 and 1A, it will be noted that multiple pins 24 are arranged in a plurality of rows and columns. A single row of cathode pins, however, is sufficient for corona discharge operation.

Referring again to FIG. 1, a DC bias supply 26 is connected across the electrodes 10 and 12 of the gas tube 14. Resistance 28 being large enough to act to isolate the DC bias supply 26 from the pulsing circuit, is connected between cathode 10 and the DC bias supply 26.

The application of a bias voltage to the electrode assembly comprising cathode 10 and anode 12 results in an electric field being formed across the electrode gap, and the average ratio of field to particle density (E/N) in the interelectrode region can then be controlled by varying the voltage of the bias supply 26. If a suitable bias voltage is used, a low-current DC glow discharge may be maintained which facilitates the initiation of the main pulsed-glow discharge.

In FIG. 1, the pulse generator 30 is connected through capacitor 32 to the cathode assembly 10. The DC bias supply 26 is essentially isolated from the impulse voltage of the pulsing system by the high impedance of resistance 28. The effect of applying the DC bias to the electrode assembly of the laser system is to reduce the pulse voltage required to create a discharge between electrodes 10 and 12. The advantage of superimposing the impulse voltage on an existing bias voltage is that of reducing the pulse amplitude facilitating the generation of a rapid rise voltage pulse and allowing for a lower voltage switching device to be used. Also it has been found that the low current glow set up by the DC bias is helpful in stabilizing the final transient glow discharge created by the pulse voltage. The laser system is thereby less subject to arcing or sparkovers which are more likely to occur when a full pulse technique without DC bias is employed. Sparkovers and arcing seriously lower efficiency and can terminate lasing action.

If the DC bias voltage applied to the discharge gap can also supply a substantial portion of the energy required by the glow discharge, additional efficiencies of operation can be gained. High-current pulse switching in sub-microsecond times and at high repetition rates increases the cost and complexity of the pulsed power supplies required in high power laser devices. Although the device shown in FIGS. 1 and 1A allows for lower voltage pulse switching, the energy from the pulse source to maintain the glow discharge is not decreased. When the pulse voltage is needed only to initiate the discharge, and a large proportion of the energy to maintain that discharge is obtained from the DC bias source, the switching means of the pulse source can be simplified thereby reducing the cost and improving the reliability of the pulse power supply.

Figure 2:
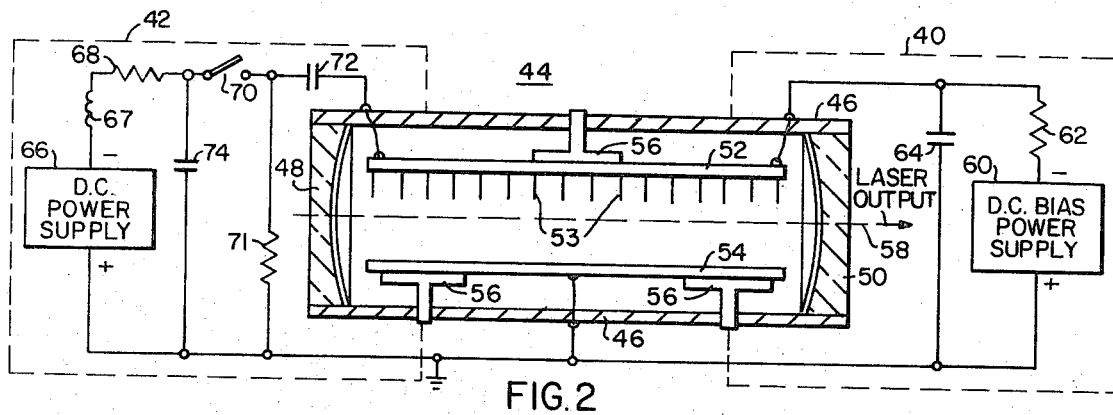
FIG. 2 is a schematic circuit diagram of one embodiment of the invention.

To achieve low energy switching, the circuit of FIG. 2 provides for energy storage in the DC bias circuit 40 between pulses and the subsequent transfer of that energy to the discharge in the gap between the electrodes during the application of the voltage pulse from the pulsing circuit 42. The device of FIG. 2 is comprised of a bias circuit 40, a gas tube 44 and a pulse circuit 42. The tube 44 and the electrode assembly contained therein is similar to that shown in FIGS. 1 and 1A. It is comprised of wall 46 sealed in an air tight manner to optical reflecting elements 48 and 50 located at either end of tube 44. Optical reflecting element 48 is essentially totally reflective and optical element 50 is partially transmissive to couple the laser beam out of the tube 44 along optical axis 58. Positioned inside the tube 44 is the electrode assembly comprised of the multiple-pin cathode 52 and the planar surface anode 54. Supporting elements 56 position the electrodes opposite one another so as to define the discharge gap therebetween. The optical axis 58 of tube 44 is parallel to the surface of anode 54 and transverse to any field established between the electrodes 54 and 52.

The bias circuit 40 includes a DC bias power supply 60 connected through resistance 62 to the cathode 52 having a plurality of pins 53. The other side of the DC bias power supply 60 is connected to the anode 54 of the gas tube 44. A capacitor 64 is connected in parallel across the resistance 62 and the power supply 60. Capacitor 64 acts as a storage reservoir for energy to be dumped into the gas discharge gap.

The pulse circuit 42 includes a DC power supply 66 connected across the electrodes 52 and 54 through an approximately critically damped LCR circuit and an energy storage circuit. The LCR circuit includes series inductance 67 and resistance 68 connected to capacitance 74 the other side of which is grounded. One side of the switching device 70, which might typically be a thyration or a solid state switching device, is connected to the junction of resistance 68 and capacitance 74. The LCR circuit is used to resonantly charge the storage element, capacitance 72. One side of capacitance 72 is connected to the switching device 70 and to ground through resistance 71. The other side of capacitance 72 is connected directly to the electrode 52. The recharging rate of capacitance 72 is thereby effectively controlled by the LCR circuit.

If the capacitor 64 of the bias circuit 40 is chosen to have a magnitude of the same order as capacitor 74 of the pulse circuit 42, the DC bias circuit 40 will supply approximately one-half of the discharge energy to the discharge gap of tube 44. It will be understood that the value of the reservoir capacitor 64 can be varied to adjust the proportion of energy supplied to the discharge gap from the DC bias circuit 40.

In the circuit of FIG. 2, the reservoir capacitor 64 represents a load on the pulse generator circuit 42. Since a high proportion of the discharge energy is to be supplied from the bias circuit, the reservoir capacitor 64 should be isolated from the pulse circuit 42 during the rise time of the voltage pulse. Once the discharge has been established by the pulse, the reservoir capacitor 64 must suddenly see a discharge path to the electrode gap with a rapid discharge time.

The circuit shown in FIG. 3 permits such isolation of the storage element in a DC bias circuit during the rise time of the pulse voltage and subsequently allows for a rapid transfer of energy to the discharge gap once the discharge has been initiated.

Figure 3:
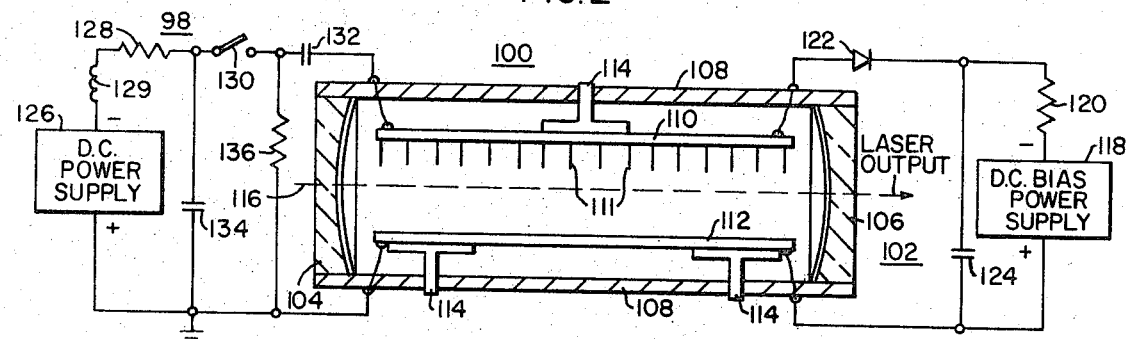
FIG. 3 is a schematic circuit diagram of another embodiment of the invention.

The device of FIG. 3 includes a pulse circuit 98, a gas tube 100 and a DC bias circuit 102. The gas tube 100, constructed similarly to the tube shown in FIG. 2, includes reflecting optical elements 104 and 106 connected in an air tight seal to wall 108. Two electrodes, a cathode 110 having a plurality of pins 111, and an anode 112 having planar surface portions are supported within the tube 100 by supports 114.

The DC bias circuit 102 is a high-energy, medium-voltage circuit and includes a DC power supply 118 having one side connected directly to anode 112 and the other side connected to the multi-pin cathode 110 through resistor 120 and diode 122. A reservoir capacitor 124 is connected across the resistance 120 and power supply 118.

The pulse circuit 98 is a high voltage low energy circuit. Circuit 98 includes DC power supply 126 connected across the electrodes 110 and 112 through an approximately critically damped LCR circuit and an energy storage circuit. The LCR circuit includes an inductance 129 serially connected to resistance 128 and a capacitance 134 connected between ground and the resistance 128. The junction of capacitance 134 and resistance 128 is connected to switch 130. The LCR circuit then resonantly charges capacitance 132 through switch 130. Capacitance 132 is connected through current limiting resistance 134 and directly to electrode 110.

The high voltage diode 122 acts as a switching means responsive to the pulse circuit 98 to dump energy from the storage capacitor 124 into the discharge gap. In operation, the high voltage diode 122 initially is forward biased. When the voltage pulse is applied from the pulse circuit 98 to the electrodes 110 and 112, the high voltage diode 122 holds off a difference voltage which typically can be of the order of 10 kv for the period of a fraction of a microsecond required to initiate the high current discharge across the electrodes 110 and 112 of the tube 100. The voltage across the discharge gap then will fall rapidly to a glow voltage less than the DC bias voltage. The diode 122 will once again be forward biased. The reservoir capacitor 124 which has been charged by the DC power supply 118 then dumps its energy into the discharge gap.

The technique used in the circuit of FIG. 3 retains the advantages of the high impedance DC bias voltage source while successfully operating at high peak power. The system has obvious advantages in reduced cost of construction and reliability for operation of pulse laser systems.

We claim:

1. A high pressure gas laser apparatus and circuit for use in producing a laser output comprising:
    an elongated envelope containing a gas medium at high pressure suitable for supporting a glow discharge,
    first and second electrode means positioned within said envelope and spaced apart one from the other to define a uniform field discharge gap therebetween;
    bias circuit means including an energy storage element connected between said first and second electrode means for maintaining a low current glow discharge therebetween;
    said bias circuit further including charging means connected to said storage element for transferring energy to said storage element;
    pulse generating means connected between said first and second electrode means for generating a pulse voltage; and
    switching means responsive to said pulse voltage for selectively and electrically connecting said energy storage element to said discharge gap for transferring energy to said glow discharge during said pulses and isolating said energy storage element from said pulse generating means at all other times.

2. The apparatus and circuit of claim 1 wherein said switching means includes a high voltage diode.

3. The apparatus and circuit of claim 1 wherein said first electrode means includes a plurality of pin elements set perpendicular to the longitudinal axis of said elongated envelope and said second electrode means includes a continuous electrode having planar surface portions.

4. The apparatus and circuit of claim 1 wherein said pulse generating means includes a first capacitive element connected to said first electrode means.

5. The apparatus and circuit of claim 4 wherein said energy storage element is a second capacitive element.

6. The apparatus and circuit of claim 5 wherein said second capacitive element has a value of the order of said first capacitive element so that approximately one half of the energy supplied to said discharge during a selected pulse is transferred from each of said capacitors.

* * * * *